Oct. 11, 1966 H. HAUTMANN 3,278,848
CORE MAGNET MEASURING MOVEMENT WITH SPRING SUPPORTED CORE
Filed Sept. 18, 1962

INVENTOR
HEINRICH HAUTMANN

BY
Nolte and Nolte
ATTORNEYS

United States Patent Office 3,278,848
Patented Oct. 11, 1966

3,278,848
CORE MAGNET MEASURING MOVEMENT WITH SPRING SUPPORTED CORE
Heinrich Hautmann, Erlangen, Bavaria, Germany, assignor to P. Gossen & Co. G.m.b.H., Erlangen, Germany
Filed Sept. 18, 1962, Ser. No. 224,379
Claims priority, application Germany, Apr. 19, 1962, G 34,778
4 Claims. (Cl. 324—151)

This invention relates to electrical meters. More particularly, this invention relates to a structure for use as a core magnet, movable coil, measuring instrument.

With the advent of superior magnetic materials, core magnet measuring instruments have gained increasing favor. This type of meter is well known, and generally includes a cylindrical core magnet secured to a carrier bracket, within a magnetic return path sleeve, by means of a thermally treated cement. The cementing operation requires special adjusting procedures, and therefore an object of this invention is to simplify the construction of a core magnet type measuring instrument by obviating such procedures.

Another object of the invention is to provide a simplified core magnet measuring instrument.

Still another object is to provide a core magnet measuring instrument wherein the magnet is secured within a carrier bracket without the need of adhesives or the like.

The objects of the invention are accomplished by positioning a cylindrical core magnet in a carrier yoke having two lugs on one side as a seat for the magnet and a separate retainer spring on the opposite side. When the magnet is inserted into the yoke, the spring is compressed so that when the magnet is properly positioned within the lugs, it is held there by the force of the spring. The spring additionally includes radially projecting spacing ears which position the bracket when it is inserted into the return path sleeve.

The manner in which these and other objects of the invention are accomplished will be more fully described with reference to the following specification and drawings wherein.

Figure 4:
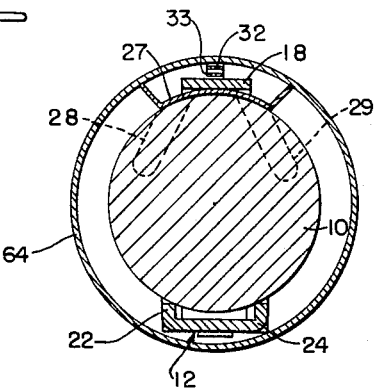
FIGURE 4 is a view along the line 4—4 of FIGURE 2.

Referring to the drawings, the cylindrical core magnet is illustrated at 10. The operation of this type of meter is well known and will not be presently discussed, since this invention is only concerned with the physical structure of the meter. Core magnet 10 is positioned in a non-magnetic carrier bracket 12 which includes vertical legs 14 and 16 and horizontal arms 18 and 20. Vertical leg 16 includes a central disc-shaped portion 17 adapted to fit flush against one of the ends of magnet 10. Horizontal arm 18 includes a pair of apertures 19 and 21 which serve to anchor the retainer spring as will be described below. A pair of integral securing lugs 22 and 24 extend inwardly from opposite sides of horizontal arm 20 and are integrally formed therewith. As shown in FIGURE 4, lugs 22 and 24 serve as a recessed seat for magnet 10.

The retainer spring, indicated generally at 26, is made of a nonmagnetic material and includes a curved, central portion 27 having a surface shaped similarly to magnet 10. Spring 26 includes diagonally disposed legs 28 and 29 which resiliently contact the end of magnet 10 facing bracket arm 14. In addition, a pair of angled spacing ears 30 and 31 extend outwardly from central curved portion 27. The spring is secured to horizontal bracket arm 18 by means of elongated securing members 32 and 33 which are inserted through apertures 19 and 21 respectively.

Figure 3:
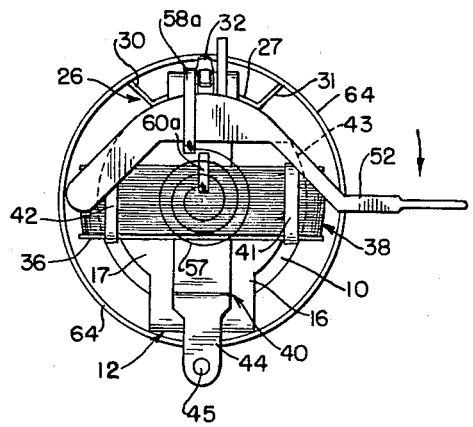
FIGURE 3 is a top view of the meter according to the invention.

A coil 38, to which the signal to be measured is fed, is wound around a rectangular coil frame 36. The interaction between the fields of the energized coil and magnet 10 cause the coil to rotate through an angle dependent upon the magnitude of the signals. A pointer support member 40 may be secured to the underside of frame 36 by means of gripping arms 41 and 42 which contact the frame as shown adjacent bracket leg 16 and serve to hold the coil within the frame. Support member 40 additionally includes an integral curved plate 43 which protrudes slightly outwardly of coil 38. The meter pointer 52 having the shape illustrated in FIGURE 3 is secured to plate 43 in any suitable manner so that rotation of the coil with respect to the vertical axis of core magnet 10 may be indicated.

Support member 40 also includes a bent balancing arm 44 extending away from plate 43 so that the pointer may be suitably balanced. If necessary, additional ballast such as solder or the like may be added to arm 44. A small stop pin 45 extends perpendicularly from the end of arm 44 and may be employed in a conventional manner to maintain the meter movement within predetermined limits.

Coil frame 40 is pivotally supported in bracket 12 by means of inwardly extending pivot pins 46 and 48 connected to the inner surfaces of frame 36 adjacent bracket legs 14 and 16 respectively. These two legs include centrally located jewelled bearings 49 and 50 in their outer surfaces adapted to receive pivot pins 46 and 48, respectively, to enable the coil to rotate with respect to the axis of core 10.

Figure 1:
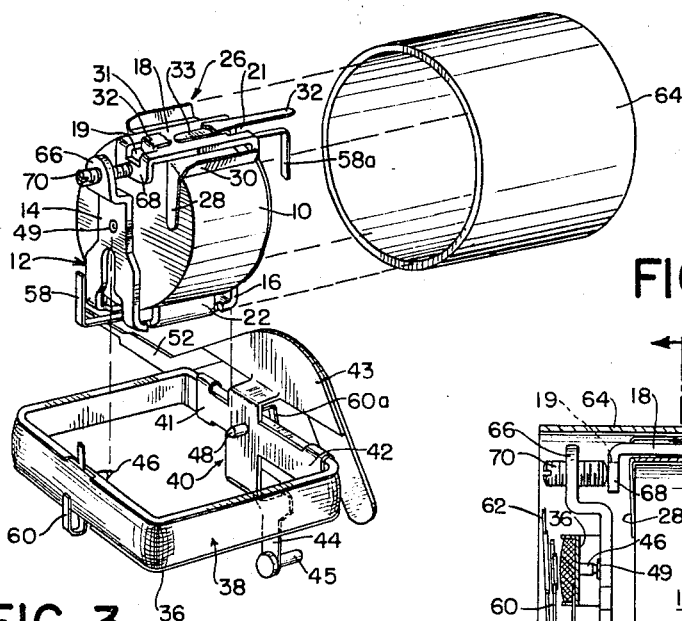
FIGURE 1 represents an exploded perspective view of the meter structure according to the invention.

A thin, L-shaped pin 58 is secured at one end to the outer surface of bracket arm 20. The opposite end of pin 58 extends, as illustrated in FIG. 1, towards the center of the system. A U-shaped securing pin 60 is secured at one end to coil frame 36 with its other end extending back and over the coil as illustrated. A first coil spring 62 is fastened to the free ends of pins 58 and 60 and adapted to be tensioned when the meter is energized so that when the coil energization is removed, spring 57 will return the coil to its initial position. In a similar manner a U-shaped securing pin 58a is secured at the opposite end of the bracket to leg 16, while a smaller U-shaped pin 60a is secured to the adjacent member of coil frame 36. A second return spring 62a is connected to the free ends of these two securing pins to provide a more positive return action.

The entire structure as above described is supported within a soft iron magnetic return sleeve 64 which functions in a conventional manner to provide the necessary flux path for the instrument. Magnetic return sleeve 64 may be secured to the meter casing in any suitable manner, and the pointer and scale suitably arranged to provide the desired readings.

Figure 2:
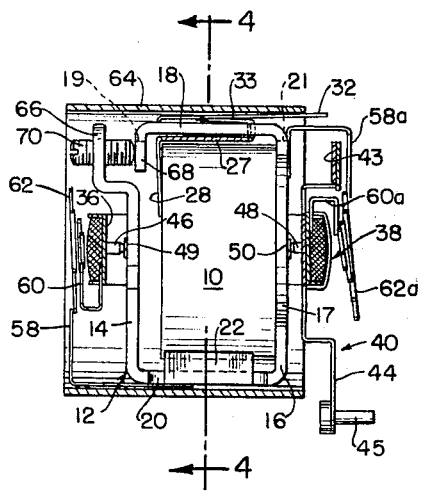
FIGURE 2 represents a side view in section of the constructed meter.

Another feature of this invention is the provision of a simple and convenient means to adjust the play in the jewelled bearings after the meter has been assembled. As shown in FIGURE 2, vertical bracket leg 14 includes an L-shaped end portion 66 which is spaced from a parallel, integral projecting portion 68 of horizontal arm 18. Bracket leg 14 is slightly resilient so that if an adjustment screw 70 is inserted through a threaded aperture in L-shaped portion 66 and adapted to abut against projection 68, the screw may be rotated to position leg 14 with respect to leg 16. Since the jewel bearings are located in the two legs of the bracket, the relative movement between these two members provides a simple and convenient means to adjust the play in the bearings.

To assemble the meter structure as above described, spring 26 is inserted in bracket 12 through apertures 19 and 21 by means of securing lugs 32 and 33 which are bent as shown to properly hold the spring in its desired position. Subsequently, core magnet 10 is inserted into the bracket with one end adjacent leg 16 of bracket 12 and the other end resting against the diagonal legs 28 and 29 of the retainer spring. Lugs 22 and 24 of bracket arm 20 insure the proper spacing of the core magnet. Coil frame 36 with coil 38 is then mounted in the jewelled bearings 49 and 50 of the brackets, and the screw 70 is adjusted as above described until the coil is suitably journalled. Finally, the entire assembly is inserted into the return path sleeve 64. Because the angled spacing ears 30 and 31 of retainer spring 36 maintain contact with the inner wall of sleeve 64 a proper centering and firm fit of all the elements within sleeve 64 is assured. For purposes of calibration, the core magnet may be pivoted until the desired angular position is reached, at which point the carrier bracket 12 may be secured to sleeve 64 by means of a suitable adhesive.

Although a specific embodiment of the invention has been described, many modifications thereof will be obvious to one skilled in the art and the invention should not be limited except as defined in the following claims.

I claim:

1. A core magnet measuring instrument comprising a cylindrical core magnet having an axis, a non-magnetic carrier bracket surrounding said magnet in a plane passing through said axis, said bracket including two apposed arms adjacent the cylindrical walls of the core magnet, one of said arms including a recessed seat portion for said core magnet, a movable coil surrounding said core magnet and bracket, said coil being pivotally supported about said axis on said bracket, a cylindrical magnetic flux return path sleeve coaxially surrounding said core magnet, bracket and coil, and a spring member positioned between said other arm and said core magnet for retaining and biasing said core magnet in the seat portion of said bracket, said spring member comprising a substantially semicylindrical curved central portion adjacent and affixed to said other arm of said bracket and a pair of spaced ears extending from said central portion toward and abutting said magnetic flux return path sleeve thereby centering said bracket in said sleeve with the outer portion of said one arm abutting the inside surface of said sleeve.

2. A core magnet measuring instrument according to claim 1, wherein said other arm includes at least one aperture and said spring member includes at least one securing lug extending through said aperture.

3. A core magnet measuring instrument according to claim 1, wherein said core magnet has spaced parallel bases and a cylindrical surface extending between said bases and the ears of said spring member extend outwardly from said central portion at angles with said central portion, said spring member further comprising diagonally disposed resilient legs extending from said central portion and abutting one of the bases of said core magnet.

4. A core magnet measuring instrument according to claim 1, where said bracket includes fixed and resilient portions adjacent respective ends of said cylindrical core magnet, said coil being pivotally supported on bearings disposed in said portions, and a screw cooperating between said resilient portion and a fixed portion of said bracket whereby the play in said bearings may be adjusted.

References Cited by the Examiner

UNITED STATES PATENTS

| 2,416,835 | 3/1947 | Lingel | 324—151 |
| 2,840,767 | 6/1958 | Ammon | 324—151 X |
| 2,978,640 | 4/1961 | Arbeiter | 324—151 |

FOREIGN PATENTS 503,480  6/1954  Canada.

OTHER REFERENCES

Publication: AIEE Miscellaneous Paper 49–162, May 1949, "A New Instrument Mechanism" by Stimson, Jennings, and McCarty.

WALTER L. CARLSON, *Primary Examiner.*

R. V. ROLINEC, *Assistant Examiner.*